United States Patent [19]

Kim

[11] Patent Number: 5,710,623
[45] Date of Patent: Jan. 20, 1998

[54] POINT-TYPE RADIO CONTROLLER USING INFARED RAYS

[75] Inventor: Jeong Yeol Kim, Suwon, Rep. of Korea

[73] Assignee: LG Electronics, Inc., Seoul, Rep. of Korea

[21] Appl. No.: 580,757

[22] Filed: Dec. 29, 1995

[30] Foreign Application Priority Data

Apr. 6, 1995 [KR] Rep. of Korea ............... 7968/1995

[51] Int. Cl.$^6$ .............................. G09G 5/08; G01B 11/26
[52] U.S. Cl. ........................................ 356/141.5; 345/158
[58] Field of Search .................................. 345/158, 181; 347/734; 356/141.5, 141.3

[56] References Cited

U.S. PATENT DOCUMENTS

| | | | |
|---|---|---|---|
| 5,009,501 | 4/1991 | Fenner et al. | 356/152 |
| 5,554,980 | 9/1996 | Hashimoto et al. | 340/825.72 |
| 5,561,543 | 10/1996 | Ogawa | 359/147 |
| 5,602,568 | 2/1997 | Kim | 345/158 |

Primary Examiner—Mark Hellner
Attorney, Agent, or Firm—John P. White

[57] ABSTRACT

A point-type radio controller using infrared rays facilitates an installation of a receiving sensor by arranging an infrared transmitter and an infrared receiver at right angle to each other, and accurately computes a coordinates-position of a designated point through double calculating coordinates value of a point in a constant time. The point-type radio controller using infrared rays includes a transmitting means for transmitting an infrared signal having a constant period, and having infrared diodes as a plurality of signal generators in the direction of Y-axis in order to achieve a constant angle; a receiving means for receiving the infrared signal by mounting infrared receiving sensors on a display device at a right angle to the infrared diodes in the direction of X-axis; and a controlling means for calculating coordinates-position of an indicated point by using an intensity difference between the infrared signals received by the receiving means, and displaying a calculated point on a display screen.

8 Claims, 7 Drawing Sheets

POINT-TYPE RADIO CONTROLLER USING INFARED RAYS

BACKGROUND OF THE INVENTION

(1) Field of the Invention

The present invention relates to a point-type radio controller using infrared rays, and more particularly, to a point-type radio controller using infrared rays for facilitating an installation of a receiving sensor by arranging an infrared transmitter and an infrared receiver at right angle to each other, and accurately computing a point-position through double calculating a coordinates value of an indicated point in a constant time.

(2) Description of the Prior Art

Conventionally, an infrared radio controller shown in FIGS. 1 and 2 includes an infrared transmitter for transmitting infrared signals having a constant period; a receiving/controlling part for receiving the infrared signals through four receiving sensors 21 to 21-3 arranged to various positions, computing a position of a designated point according to an intensity difference between the infrared signals received from each of four receiving sensors 21 to 21-3, and displaying a computed position on a display screen 11.

Referring to FIG. 3, the conventional infrared radio controller includes a periodic pulse generator 12 for generating a periodic pulse according to on/off operations of a switch SW; a carrier signal generator 13 for generating a carrier signal; a current amplifier 14 for amplifying both the periodic pulse and the carrier signal; an infrared-emitting diode 15 for emitting an amplified signal from the current amplifier 14; infrared receiving sensors 21 to 21-3 for sensing an emitted signal as a position arranged from the edge of a screen; amplifiers 22 to 22-3 for amplifying carrier signals from the infrared receiving sensors; envelope detectors 23 to 23-3 for eliminating the carrier signal from the amplifiers, and sensing a level responsive to a light intensity inputted to the infrared receiving sensors 21 to 21-3; a multiplexer 24, a sample-and-hold circuit 25, and an analog-to-digital converter 26 sequentially connected to one another for sequentially converting each of the output levels from the envelope detectors 23 to 23-3 to digital data; coordinates calculator 27 for calculating coordinates-position of a display screen 11 (shown in FIG. 2) being currently displayed, by using an output signal of the analog-to-digital converter 26 as an input; a main processor 28 for displaying a current point on the display screen 11 by matching the display screen 11 and the coordinates-position to each other; and a control-logic part 29 for controlling a driving timing needed to each of the above devices.

The conventional infrared radio controller shown in FIGS. 1 and 2, when not only the infrared receiving sensors 21 to 21-3 are installed to four positions of the display screen 11, but also an infrared signal is transmitted toward a predetermined position by using the infrared transmitter 10, a light intensity inputted to each of the infrared receiving sensors 21 to 21-3 differently appears.

That is, if a switch SW is turned on, the periodic pulse generator 12 generates continuously periodic pulses until the switch is turned off. The periodic pulses are inputted to a current amplifier 14, together with a carrier signal generated from a carrier signal generator 13. The current amplifier 14 amplifies a current needed to an infrared-emitting diode 15 for emitting the periodic pulse and the carrier signal to outside.

The amplified signal identical with an infrared signal emitted by the infrared-emitting diode 15 is sensed by the infrared receiving sensors 21 to 21-3, and then the amplifiers 22 to 22-3 amplify again the infrared signal weakened in receiving.

The envelope detectors 22 to 22-3 eliminate a carrier signal from the infrared signal amplified by the amplifiers 22 to 22-3, and output a level responsive to a light intensity of the infrared signal inputted to the infrared receiving sensors 21 to 21-3 to a multiplexer 24.

Accordingly, each of the levels responsive to the light intensity of the infrared rays is converted successively to digital data through a multiplexer 24, a sample-and-hold circuit 25, and an analog-to-digital converter 26, so that a coordinates-position of the display screen 11, indicated by the coordinates calculator 27, is calculated.

At this time, by matching the display screen 11 and the axis of the coordinates-position to each other, a current point is inputted to the main processor 28 in order to display itself on the screen 11. A control-logic part 24 controls a driving timing needed to each of the above devices.

However, since the conventional infrared radio controller must attach receiving sensors on four portions specified on the display screen, the installation of the receiving sensors is not easily achieved.

Furthermore, the conventional infrared radio controller discriminates a level difference among light intensities of the infrared signals inputted the receiving sensors, and only once calculates coordinates-position of a designated point in a constant time, thereby inaccurately calculating the coordinates-position.

SUMMARY OF THE INVENTION

An object of the present invention is to provide a point-type radio controller using infrared rays for facilitating an installation of a receiving sensor by arranging an infrared transmitter and an infrared receiver at right angle to each other, and accurately computing a point-position through double calculating a coordinates value of a point in a constant time.

In order to achieve this object, the present invention comprises a transmitting means for transmitting an infrared signal having a constant period, and having infrared diodes as a plurality of signal generators in the direction of Y-axis in order to achieve a constant angle$\alpha$; a receiving means for receiving the infrared signal by mounting infrared receiving sensors on a display device at a right angle to the infrared diodes in the direction of X-axis; and a controlling means for calculating coordinates-position of an indicated point by using an intensity difference between the infrared signals received by the receiving means, and displaying a calculated point on a display screen.

The transmitting means includes a key inputting part; a periodic pulse generator for receiving output signals (e.g., a cursor control signal, a selection command, and an operation command) from the key inputting part as an input, and generating a periodic pulse for both a code identifying signal and a synchronization identifying signal; a transmitter for converting the periodic pulse to the infrared signal, and then transmitting the infrared signal to the infrared diodes; a carrier generator for adding a carrier signal to an output terminal of the transmitter; and infrared diodes as a plurality of signal generators, for emitting the infrared signals outputted from the transmitter to outside.

The controlling means includes envelope detectors as a plurality of signal reproducers, for receiving output signals from the receiving means, eliminating a carrier signal included to the output signals from the receiving means, and reproducing an original infrared signal by detecting an envelope signal; a coordinates calculator for receiving output signals from the envelope detectors as an input, converting the output signals to digital data, and calculating a coordinates-position of an indicated point being currently displayed on display device; a cursor controller for moving a cursor exhibited on a display device to a calculated coordinates-position by using coordinates value calculated by the coordinates calculator; and a cursor-control-communication-controller for delivering the coordinates-position calculated by the coordinates calculator to another equipment (not shown in drawings).

The coordinates calculator includes a synchronization identifying signal detector composed of both a sample-and-hold circuit and an analog-to-digital converter, for receiving each of envelope signals outputted from the envelope detectors, and detecting a synchronization identifying signal; a time interpreting part composed of both an up-counter which adds the envelope signals from the envelope detectors and a comparator which outputs the envelope signals added by the up-counter as a digital signal, for receiving output signals of the envelope detectors as an input, and interpreting a time interval; and a microprocessor for receiving both the synchronization identifying signal from the synchronization identifying signal detector and the time interval from the time interpreting part as an input, and calculating a coordinates-position.

Both the receiving means and the transmitting means can be detachably attached to the display device.

DETAILED DESCRIPTION OF THE PREFERRED EMBODIMENTS

Figure 1:
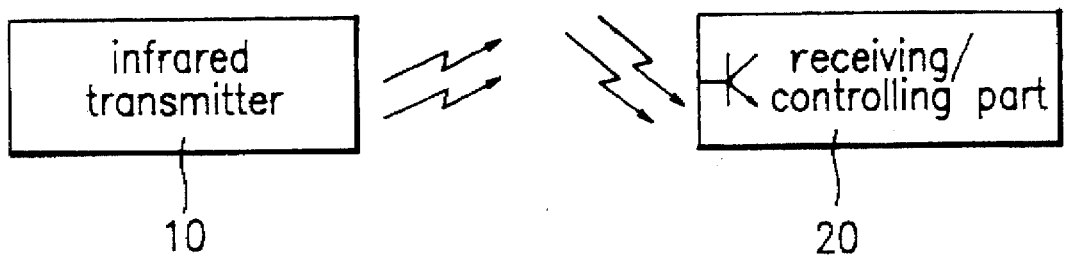
FIG. 1 is a block diagram of a radio controller in accordance with a prior art.
Figure 2:
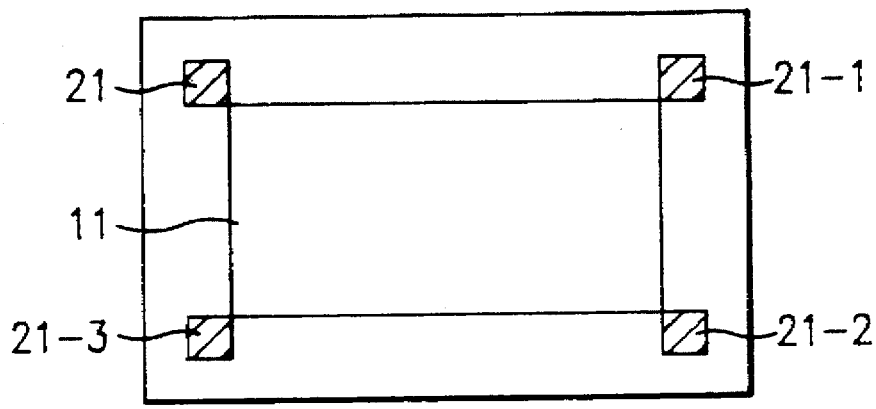
FIG. 2 shows infrared receiving sensors arranged to a monitor in accordance with the prior art.
Figure 3:
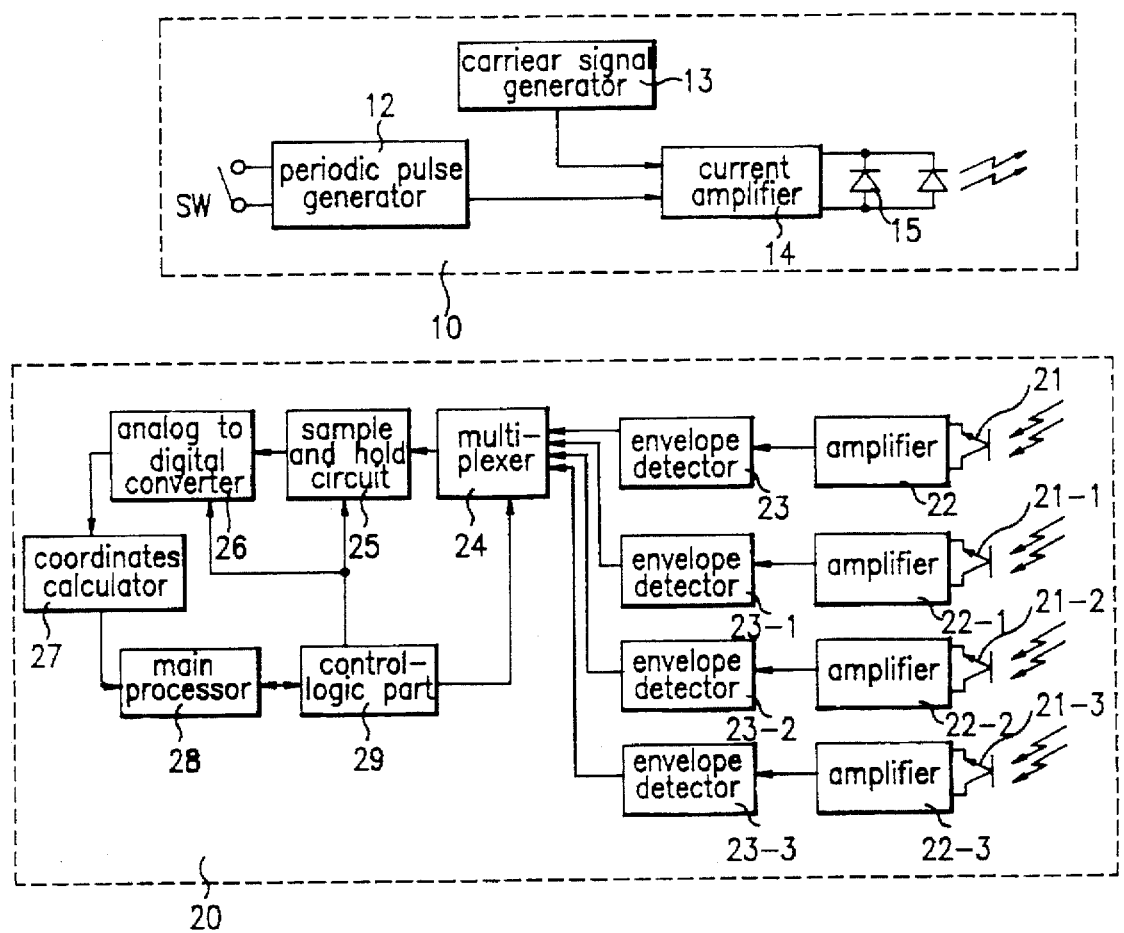
FIG. 3 is a block diagram of a point-type radio controller using infrared rays in accordance with the prior art.
Figure 4:
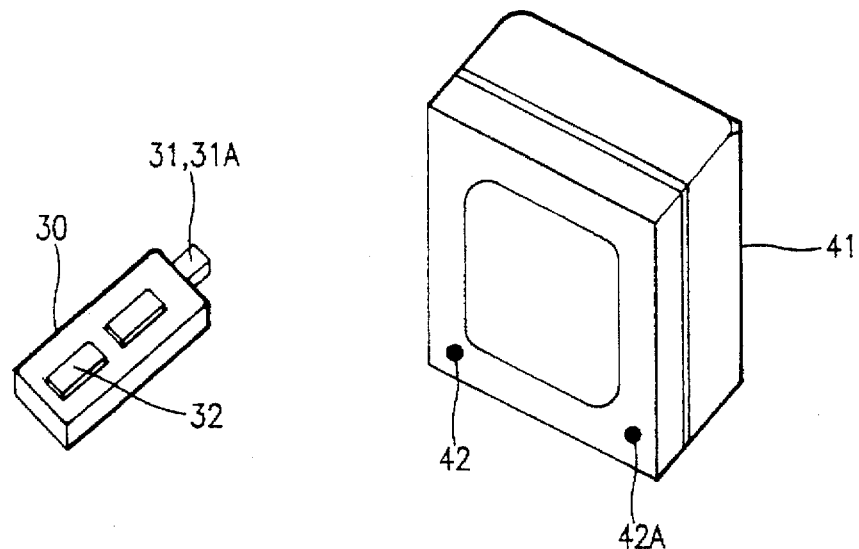
FIG. 4 shows a point-type radio controller using infrared rays in accordance with the present invention.

Referring to FIGS. 4 to 7, a point-type infrared radio controller using infrared rays comprises a transmitting means 30 for transmitting an infrared signal having a constant period, and having infrared diodes 31 and 31A as a plurality of signal generators in the direction of Y-axis in order to achieve a constant angle α; a receiving means 40 for receiving the infrared signal by mounting infrared receiving sensors 42 and 42A on a display device 41 at a right angle to the infrared diodes 31 and 31A in the direction of X-axis; and a controlling means 50 for calculating coordinates-position of an indicated point by using an intensity difference between the infrared signals received by the receiving means 40, and displaying a calculated point on a display screen.

The transmitting means 30 includes a key inputting part 32; a periodic pulse generator 33 for receiving output signals (e.g., a cursor control signal, a selection command, and an operation command) from the key inputting part 32 as an input, and generating a periodic pulse for both a code identifying signal A and a synchronization identifying signal B; a transmitter 34 for converting the periodic pulse to the infrared signal, and then transmitting the infrared signal to the infrared diodes 31 and 31A; a carrier generator 35 for adding a carrier signal to an output terminal of the transmitter 34; and infrared diodes 31 and 31A as a plurality of signal generators, for emitting the infrared signals outputted from the transmitter 34 to outside.

The receiving means 40 includes infrared receiving sensors 42 and 42A for receiving the infrared signal from the transmitting means 30; and amplifying/filtering parts 43 and 43A for amplifying the infrared signal weakened in receiving, and then filtering the infrared signal, as shown in FIGS. 8A to 8F.

The controlling means 50 includes envelope detectors 51-1 and 51-2 as a plurality of signal reproducers, for receiving output signals from the receiving means 40, eliminating a carrier signal included to the output signals from the receiving means 40, and reproducing an original infrared signal by detecting an envelope signal; a coordinates calculator 52 for receiving output signals from the envelope detectors 51-1 and 51-2 as an input, converting the output signals to digital data, and calculating a coordinates-position of an indicated point being currently displayed on display device 41; a cursor controller 53 for moving a cursor exhibited on a display device 41 to a calculated coordinates-position by using a coordinates value calculated by the coordinates calculator 52; and a cursor-control-communication-controller 54 for delivering the coordinates-position calculated by the coordinates calculator 52 to external equipments.

The coordinates calculator 52 includes a synchronization identifying signal detector composed of both a sample-and-hold circuit 52A-1 and an analog-to-digital converter 52A-2, for receiving the envelope signals outputted from the envelope detectors 51-1 and 51-2, and detecting a synchronization identifying signal B; a time interpreting part 52B composed of both an up-counter 52B-1 and a comparator 52B-2, for receiving output signals of the envelope detectors as an input, and interpreting a time interval; and a microprocessor 52C for receiving both the synchronization identifying signal from the synchronization identifying signal detector 52A and the time interval from the time interpreting part 52B as an input, and calculating the coordinates-position.

In addition to, an element shown as a reference number 44 is a line driver.

Figure 8:
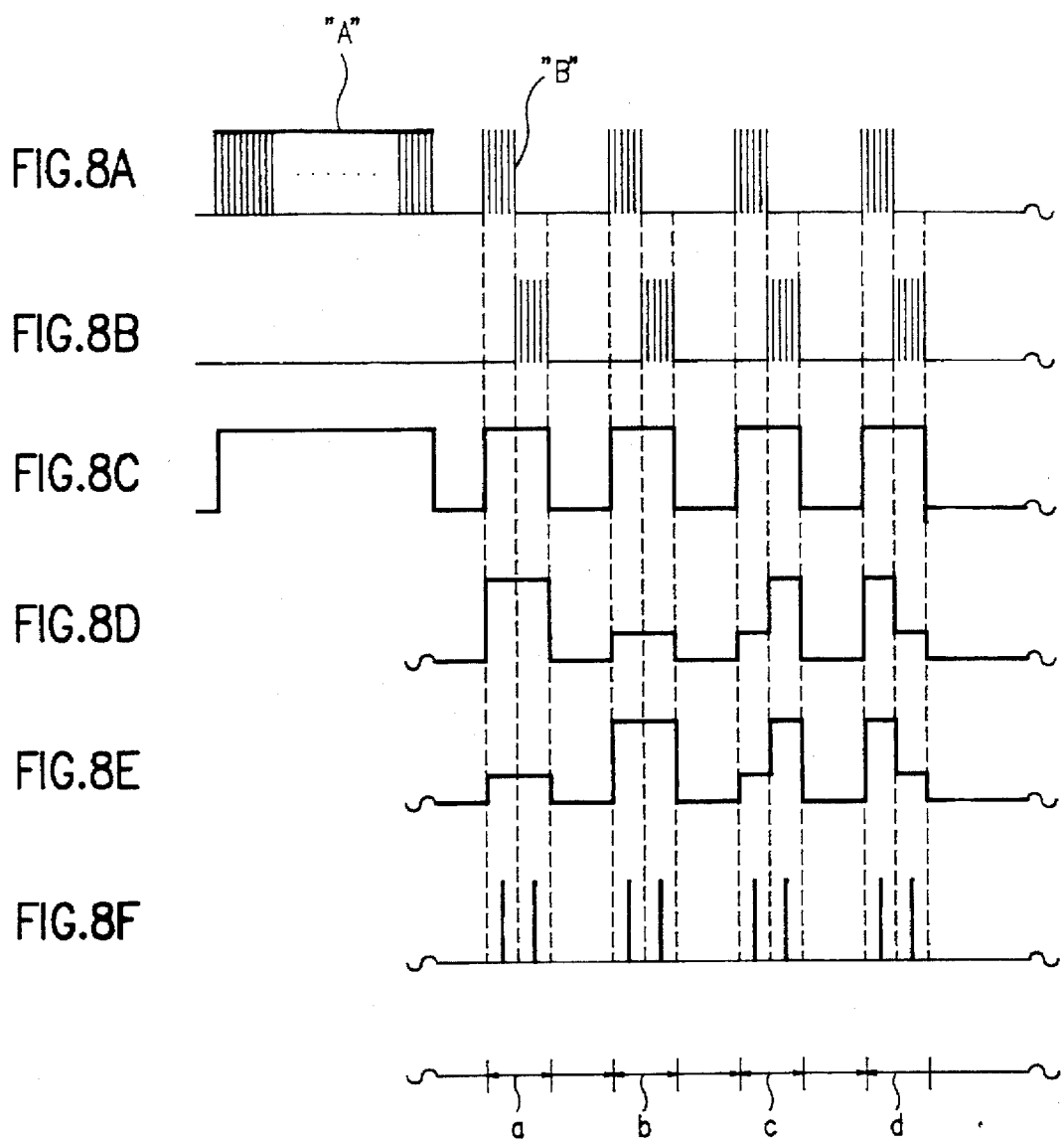
FIGS. 8A to 8F are timing diagrams for several elements included in FIG. 7.

Operations of the point-type infrared radio controller are described below:

As to the transmitting means 30, when various key signals (e.g, a cursor control signal, a selection command, and an operation command) are applied to a periodic pulse generator 33 through a key inputting part 32, the periodic pulse generator 33 generates both a code identifying signal A and a periodic pulse signal as shown in FIG. 8A, and transmits them to a transmitter 34. In addition to, as shown in FIG. 8B, the periodic pulse generator 33 further generates a synchronization identifying signal B according to the cursor control signal.

Figures 5A, 5B:
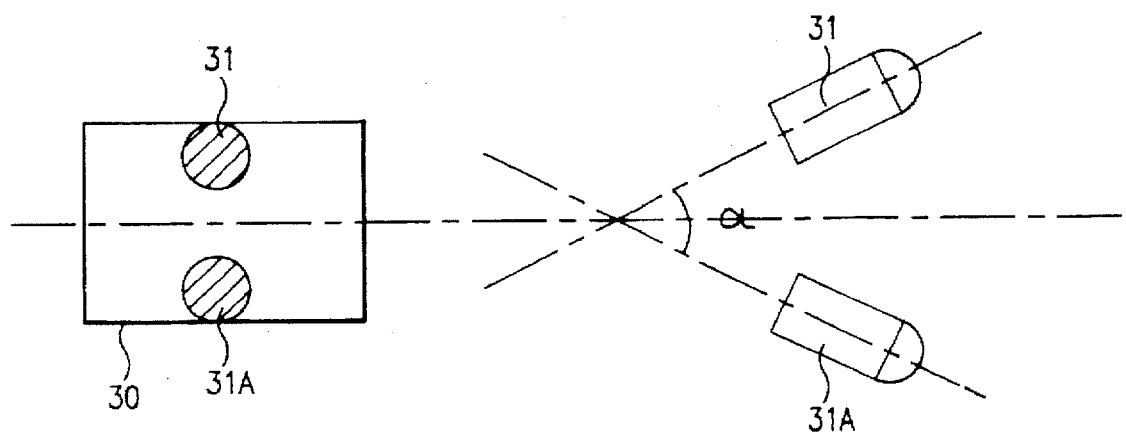
FIGS. 5A and 5B show infrared-emitting diodes arranged in an array of the present invention.
Figure 6A:
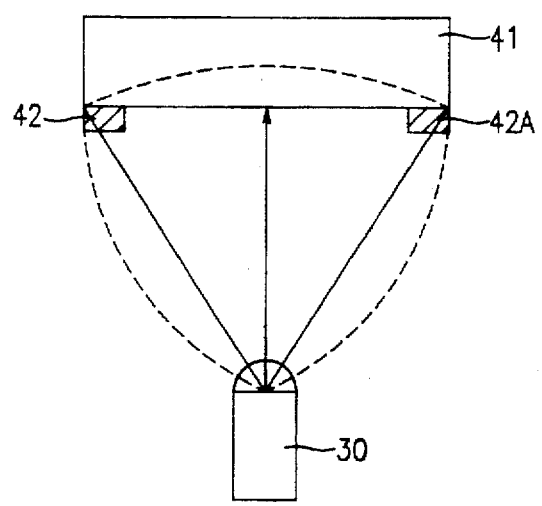
FIGS. 6A and 6B are a plan view and a side view illustrating the distribution of a beam outputted from the infrared-emitting diodes in accordance with the present invention.
Figure 6B:
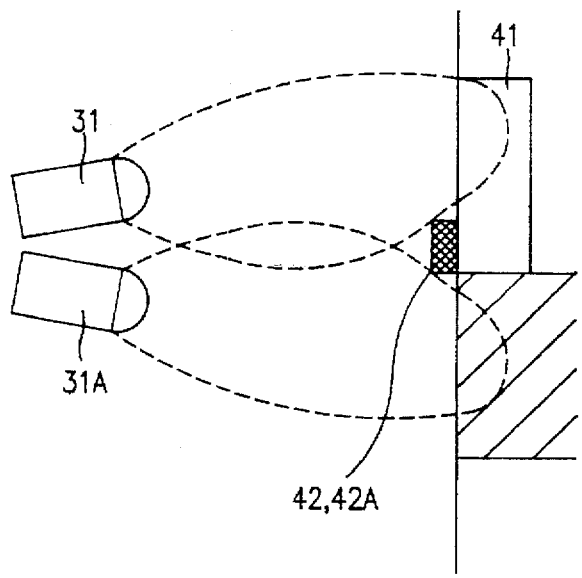
Figure 7:
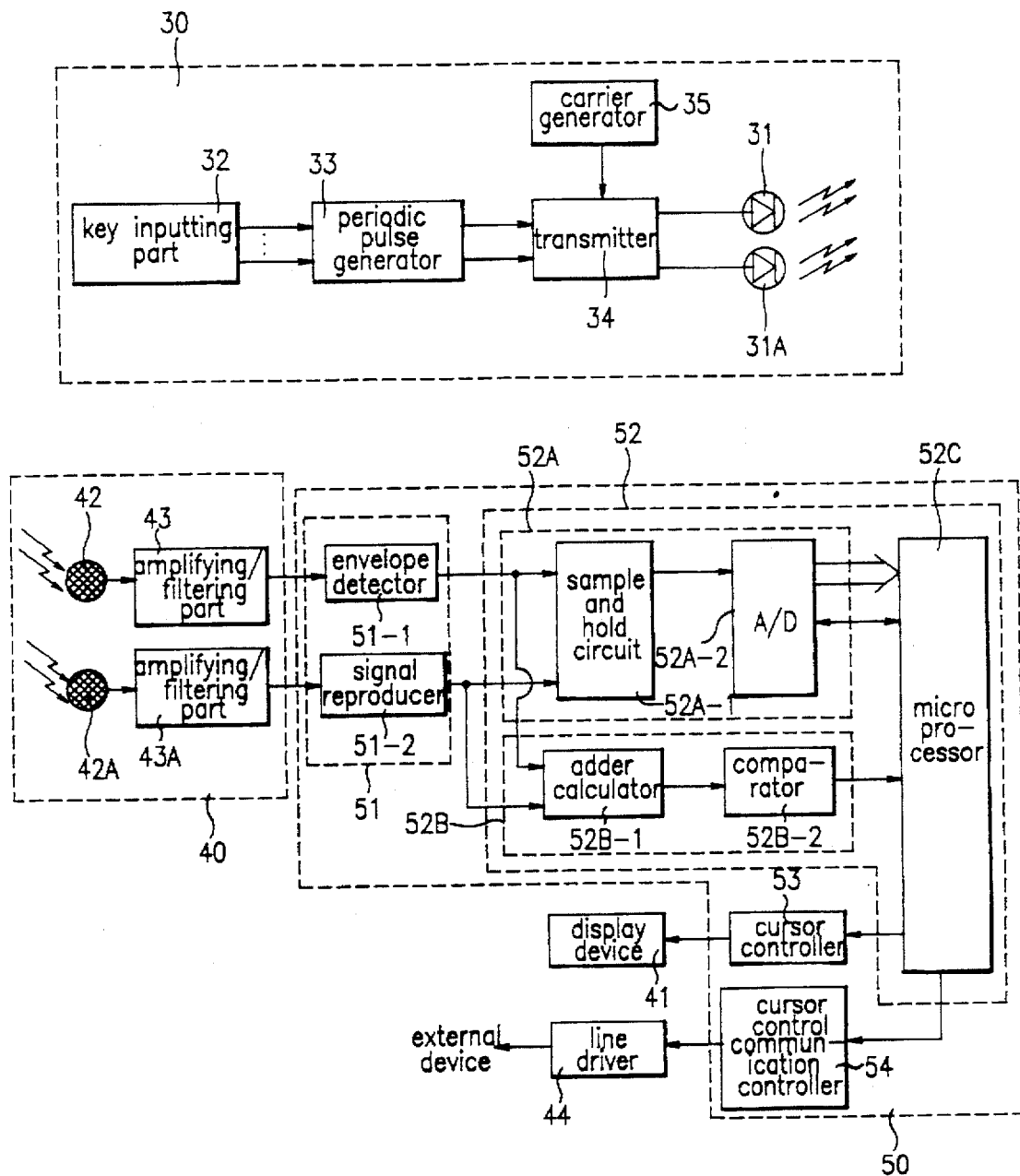
FIG. 7 is a block diagram of a point-type radio controller using infrared rays in accordance with a preferred embodiment of the present invention.

The transmitter 34 mixes both a carrier signal from a carrier signal generator 35 and the periodic pulse from the periodic pulse generator 33, and converts a mixed signal to an infrared signal. Therefore, the infrared diodes 31 and 31A emit the infrared signal from the transmitter 34 to outside, as shown in FIGS. 5A and 5B. At this time, the distribution of infrared rays outputted from the infrared diodes is described in FIGS. 6A and 6B.

In the receiving means 40, infrared receiving sensors 42 and 42A installed at a lower part of the display device 41 in the direction of X-axis, being maintained a constant distance between them, receive the infrared signal from the transmitting means 30, and apply the infrared signal to amplifying/filtering parts 43 and 43A. In this case, the amplifying/filtering parts 43 and 43A amplify the infrared signal weakened in receiving, filter the infrared signal, and then apply the infrared signal to a controlling means 50.

Therefore, as shown in FIGS. 8D and 8E, when envelope detectors 51-1 and 51-2 as a signal reproducer 51 in the controlling means 50 detect an envelope signal in which a carrier signal is eliminated, reproduce an original infrared signal, and output the original infrared signal to a coordinates calculator 52. The coordinates calculator 52 receives the output signals of the envelope detectors 51-1 and 51-2 as an input, converts them to digital data, and calculates a coordinates-position of a designated point being currently displayed on the display device 41.

The infrared signals reproduced by the envelope detectors 51-1 and 51-2 are added to each other in an up-counter 52B-1 included to a time interpreting part 52B in the coordinates calculator 52, are applied to a comparator 52B-2, and are reproduced as an original digital signal as shown in FIG. 8C. The original digital signal is applied to a microprocessor 52C in order to interpret a time interval. The microprocessor 52C interprets the time interval, thereby discriminating a code.

In this case, in case of a command in which a cursor is not moved, a general processing is achieved. However, in case that another command for moving the cursor is inputted to this invention, both the sample-and-hold circuit 52A-1 and the analog-to-digital converter 52A-2 installed to the synchronization identifying signal detector 52A in the coordinates calculator 52, detect a synchronization identifying signal B shown in FIG. 8A, from each of the envelope signals outputted from the envelope detectors 51-1 and 51-2, and apply this signal B to the microprocessor 52C.

Accordingly, when the microprocessor 52C respectively calculates coordinates values of X-axis and Y-axis by interpreting a relative difference of the synchronization identifying signal B, and applies both coordinates values to a cursor controller 53, the cursor controller 53 moves a cursor being displayed on the display device 41 to the calculated coordinates values of both X-axis and Y-axis.

In addition to, to transmit the coordinates values of X-axis and Y-axis from the microprocessor 52C, to the external equipment, a cursor-control-communication-controller 54 transmits the coordinates values from the microprocessor 52C to the external equipment through a line driver 44.

Referring to FIG. 8F, the transmitting means 30 and the receiving means 40 have four kinds of output signal patterns, that is, output signal patterns in areas a, b, c, and d.

Firstly, in the area a, Y-axis oft he transmitting means is intended to be displayed on a central part in the display screen and X-axis of the receiving means is intended to be displayed on a left part in the display screen, in which the output signals from the infrared diodes 31 and 31A are equally displayed on the receiving means 40.

Secondly, in the area b, Y-axis of the transmitting means is intended to be displayed on a central part in the display screen and X-axis of the receiving means is intended to be displayed on right part in the display screen, in which the direction of X-axis is opposite to the case of the area a.

Thirdly, in the area c, X-axis of the receiving means is intended to be displayed on a central part in the display screen and Y-axis oft he transmitting means is intended to be displayed on upper part in the display screen, in particular, since the infrared signals received through the infrared receiving sensors 42 and 42A are equally displayed in same visual point, the transmitting means indicates a center point in the direction of X-axis, since the output signals from the infrared receiving diodes 31 and 31A are differently displayed in the receiving means, the transmitting means intends that Y-axis is displayed on upper part in the display screen.

Finally, in the area d, X-axis of the receiving means is intended to be displayed on a central part in the display screen and Y-axis of the transmitting means is intended to be displayed on lower part in the display screen, in which the direction of Y-axis is opposite to the case of the area c.

Figure 9:
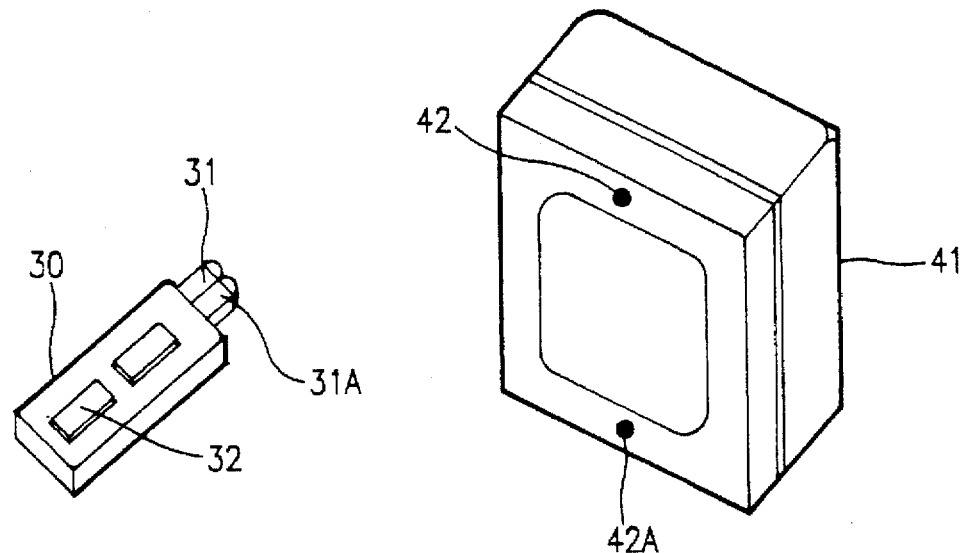
FIG. 9 shows infrared receiving sensors arranged to a monitor in accordance with the preferred embodiment of the present invention.

Referring to FIG. 9, a point-type radio controller using infrared rays in accordance with a first preferred embodiment of the present invention, arranges infrared diodes 31 and 31A in a transmitting means which emits an infrared signal of a constant period, in the direction of X-axis in order to achieve a constant angle. A receiving means 40 for receiving the infrared signal mounts infrared receiving sensors 42 and 42A to both upper and lower parts in a display device 41 in the direction of X-axis, to be maintained a constant distance between the infrared receiving sensors 42 and 42A. A method for calculating the coordinates-position of a point are opposite to the aforementioned-method.

Figure 10:
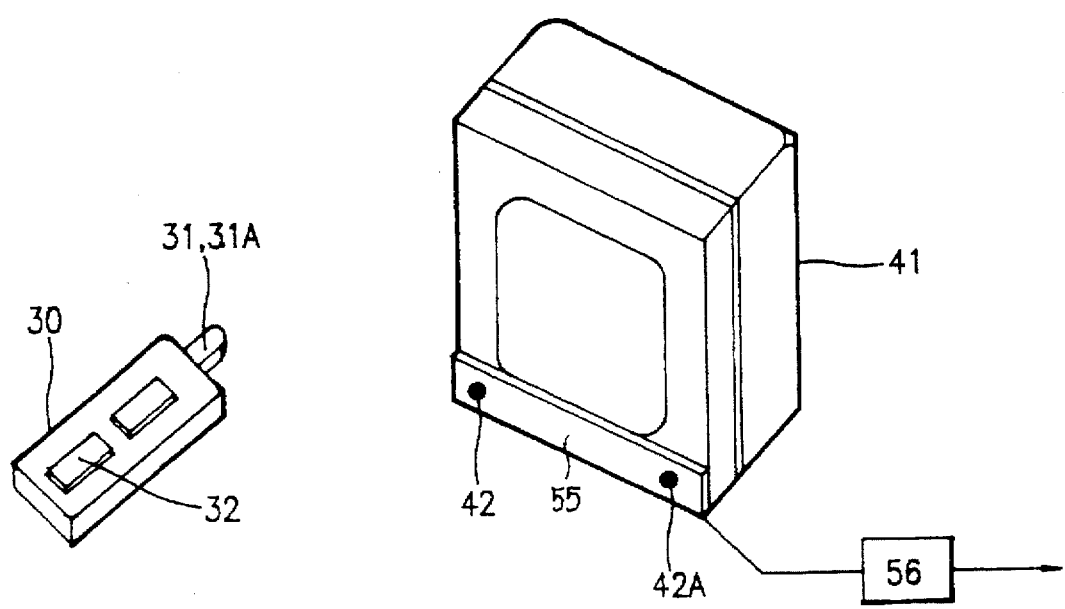
FIG. 10 shows infrared receiving sensors arranged to a monitor in accordance with another preferred embodiment of the present invention.

Referring to FIG. 10, a point-type radio controller using infrared rays in accordance with another preferred embodiment of the present invention, includes additional sensor-attaching-equipment 55 without mounting infrared receiving sensors 42 and 42A on display device 41, attaches the infrared receiving sensors 42 and 42A to the sensor-attaching equipment 55, is connected to another equipment (not shown in drawing) through an external receiver 56, thereby achieving an apparatus such as adapter.

As described above, the present invention facilitates an installation of a receiving sensor by arranging an infrared transmitter and an infrared receiver at right angle to each other, and accurately computes a coordinates-position of a point through double calculating a coordinates value of a point in a constant time.

What is claimed is:

1. A point-type radio controller using infrared rays, comprising:
    a transmitting means for transmitting an infrared signal having a constant period, and having infrared diodes as a plurality of signal generators in the direction of the Y-axis in order to achieve a constant angle;
    a receiving means for receiving said infrared signal by mounting infrared receiving sensors on a display device at a right angle to said infrared diodes in the direction of the X-axis; and a controlling means for calculating a coordinates-position of an indicated point by using an intensity difference between said infrared signals received by said receiving means, and displaying a calculated point on a display screen.

2. The point-type radio controller using infrared rays as defined in claim 1, wherein said transmitting means comprises:

a key inputting part;

a periodic pulse generator for receiving a key signal from said key inputting part as an input, and generating a periodic pulse for both a code identifying signal and a synchronization identifying signal;

a transmitter for converting said periodic pulse to said infrared signal, and then transmitting said infrared signal to said infrared diodes;

a carrier generator for adding a carrier signal to an output terminal of said transmitter; and infrared diodes as a plurality of signal generators, for emitting said infrared signals outputted from said transmitter to outside.

3. The point-type radio controller using infrared rays as defined in claim 2, wherein:

said key signal is any one among a cursor control signal, a selection command, and an operation command.

4. The point-type radio controller using infrared rays as defined in claim 1, wherein said controlling means comprises:

envelope detectors as a plurality of signal reproducers, for receiving output signals from said receiving means, eliminating said carrier signal included to the output signals from said receiving means, and reproducing an original infrared signal by detecting an envelope signal;

coordinates calculator for receiving output signals from said envelope detectors as an input, converting said output signals to digital data, and calculating a coordinates-position of an indicated point being currently displayed on display device;

a cursor controller for moving a cursor exhibited on said display device to a calculated coordinates-position by using coordinates value calculated by said coordinates calculator; and a cursor-control-communication-controller for delivering said coordinates-position calculated by said coordinates calculator to external equipment.

5. The point-type radio controller using infrared rays as defined in claim 4, wherein said coordinates calculator comprises:

a synchronization identifying signal detector composed of both a sample-and-hold circuit and an analog-to-digital converter, for receiving each of envelope signals outputted from said envelope detectors, and detecting a synchronization identifying signal;

a time interpreting part composed of both an up-counter and a comparator, for receiving output signals of said envelope detectors as an input, and interpreting a time interval; and a microprocessor for receiving both said synchronization identifying signal from said synchronization identifying signal detector and said time interval from said time interpreting part as an input, and calculating said coordinates-position.

6. The point-type radio controller using infrared rays as defined in claim 5, wherein said time interpreting part comprises:

an up-counter for adding said envelope signals from said envelope detectors; and a comparator for outputting said envelope signals added by said up-counter as a digital signal.

7. The point-type radio controller using infrared rays as defined in claim 1, wherein:

said receiving means and said transmitting means are detachably attached to said display device.

8. The point-type radio controller using infrared rays as defined in claim 4, wherein:

said receiving means and said transmitting means are detachably attached to said display device.

* * * * *